US005749994A

United States Patent [19]
Sundet

[11] Patent Number: 5,749,994
[45] Date of Patent: May 12, 1998

[54] LAMINATE FOR PRECISE APPLICATION OF GRAPHICS TO A SUBSTRATE

[75] Inventor: Douglas C. Sundet, North Hudson, Wis.

[73] Assignee: Minnesota Mining and Manufacturing Company, St. Paul, Minn.

[21] Appl. No.: 858,305

[22] Filed: May 19, 1997

Related U.S. Application Data

[62] Division of Ser. No. 559,025, Nov. 16, 1995, Pat. No. 5,665,446.

[51] Int. Cl.$^6$ .................................................. B32B 31/14
[52] U.S. Cl. ........................................ 156/230; 156/236
[58] Field of Search .............................. 428/40.1, 40.2, 428/41.6, 41.7, 41.8, 41.9, 421, 137, 138, 201, 202, 203, 204, 213, 214, 914, 518; 156/230, 236

[56] References Cited

U.S. PATENT DOCUMENTS

| | | | |
|---|---|---|---|
| 2,465,927 | 3/1949 | Rapp | 154/46.8 |
| 3,294,611 | 12/1966 | Vomela | 156/230 |
| 4,277,024 | 7/1981 | Spector | 239/36 |
| 4,409,275 | 10/1983 | Samowich | 428/138 |
| 4,673,609 | 6/1987 | Hill | 428/187 |
| 4,759,982 | 7/1988 | Jenssen | 428/914 |
| 4,814,212 | 3/1989 | Spector | 428/14 |
| 4,919,994 | 4/1990 | Incremona et al. | 428/141 |
| 5,076,612 | 12/1991 | Nirmel | 283/67 |
| 5,246,757 | 9/1993 | Condon et al. | 428/40 |
| 5,494,726 | 2/1996 | Inomata | 428/131 |

FOREIGN PATENT DOCUMENTS

| | | | |
|---|---|---|---|
| 0 580 981 A1 | 2/1994 | European Pat. Off. | C09J 7/02 |
| 626 002 | 10/1981 | Sweden | B22B 3/24 |
| WOA94 14912 | 7/1994 | WIPO | |

OTHER PUBLICATIONS 3M advertising document from 3M Commercial Graphics Division, St. Paul, MN dated Dec. 1991 and bearing the No. 75–5100–0146–6.

Front and Rear cover sheets and Instructions sheet from a product called Reddi–etch(T.M.) Etched Glass Rub–on Designs from Plaid Enterprises, Inc. dated Dec. 1993.

Product Bulletin 7725SE dated Oct. 1992 from 3M Commercial Graphics Division.

Instruction Bulletin 4.3 dated Mar. 1991 from 3M Commercial Graphics Division.

International Search Report PCT/US/08611, related case, Dec. 1995.

*Primary Examiner*—Alexander Thomas
*Attorney, Agent, or Firm*—William L. Huebsch

[57] ABSTRACT

Known laminates can be used to apply graphics to glass panels to present an etched or sand-blasted appearance. Such graphics, which have been cut from a decorative polymeric film of a laminate, can be applied more easily, quickly, and with greater precision when the cover sheet of the laminate is a vented transparent polymeric sheet which bears a layer of vented removable pressure-sensitive adhesive that has been pressed against the graphics. Coextensive with each of the graphics is a layer of aggressive pressure-sensitive adhesive by which the graphics can be applied to a glass panel while wet with a detergent/alcohol/water solution that permits them to be repositioned by a user who can see the graphics through the vented transparent sheet. Positioning is enhanced when the vents are perforations arranged in an orderly pattern such as a rectangular grid.

3 Claims, 2 Drawing Sheets

LAMINATE FOR PRECISE APPLICATION OF GRAPHICS TO A SUBSTRATE

This is a division of application Ser. No. 08/559,025 filed Nov. 16, 1995 U.S. Pat. No. 5,665,446.

BACKGROUND OF THE INVENTION

1. Field of the Invention

The invention is primarily concerned with the application of designs and other graphics to smooth substrates and is particularly concerned with forming graphics on glass panes, which graphics appear to have been etched or sand-blasted into the glass.

2. Description of the Related Art

The company to which this application is assigned manufactures vinyl films which can be applied to glass panes to form graphics that appear to have been etched or sand-blasted into the glass at a fraction of the cost of actual etching or sand blasting. These vinyl films, typically plasticized poly(vinyl chloride), are marketed as Scotchcal™ Series 7725 special effects films. Among these, Scotchcal™ 7725-314 Dusted Crystal Film gives the appearance of etched glass, and Scotchcal™ 7725-324 Frosted Crystal Film gives the decorative appearance of sand-blasted glass. Each of these is translucent white. The ability to form such graphics makes it economically feasible to warn persons, in a visually attractive manner, not to walk into a large glass panel that otherwise might be mistaken for a door. Both decorations and messages (below collectively called "graphics") may be used in any such warning.

Each of these special effects vinyl films bears a layer of aggressive pressure-sensitive adhesive and a low-adhesion carrier web that protects the adhesive. The pressure-sensitive adhesive is selected to form strong bonds to glass.

In use, graphics are cut into the special effects vinyl film without cutting through the carrier web, and the adhesive-bearing weed is peeled from the carrier web and discarded. A piece of paper that bears a removable pressure-sensitive adhesive (here called an "application tape") is temporarily adhered by that adhesive to the exposed faces of the graphics. The low-adhesion carrier web is removed to expose remaining areas of aggressive pressure-sensitive adhesive. Both the adhesive side of the paper-covered graphics and a glass panel are wet with a solution of non-creamy dish detergent and rubbing alcohol in water. The wet, aggressive pressure-sensitive adhesive covering the graphics is pressed against the wet panel, and the detergent, alcohol, and water solution is allowed to evaporate until the graphics have become bonded to the panel. The application tape is then peeled off to expose the graphics.

The detergent, alcohol and water solution has two functions. First, when using a squeegee, the solution aids in eliminating air from the interface between the graphics and the glass panel. Second, the solution permits the graphics to be repositioned to a desired location, based on measurements made before the solution is applied. Such measurements are necessary because the graphics cannot be seen through the sheet of paper. Because the difficulty of making and using those measurements, the special effects vinyl films have been marketed primarily for application by skilled artisans.

In addition to being used to form graphics on glass panels to achieve an etched or sand-blasted appearance, special effects vinyl films are applied in the same manner to form other graphics on various substrates such as the side of a truck or other automotive vehicle.

A number of additional commercial products are used to apply graphics to glass panels and to other substrates. In several of these, the outer sheet that covers the graphics-forming layer is transparent or translucent, e.g., a polypropylene film. Illustrative is SCTT-10 application tape manufactured by the company to which this application is assigned.

SUMMARY OF THE INVENTION

The laminate of the present invention makes it easy to apply graphics with precision. For example, the novel laminate should make it feasible for the do-it-yourself market to apply graphics that give an etched or sand-blasted appearance to glass panes. Furthermore, the ease with which they can be applied should allow skilled artisans to apply graphics more quickly and with less risk of mispositioning, as compared to applying prior special effects films.

Briefly, the laminate of the present invention includes (1) a transparent polymeric cover sheet having opposite outer and inner major surfaces, (2) a layer of removable pressure-sensitive adhesive having opposite front and rear major surfaces that is coextensive with and has its rear surface adhered to the inner major surface of the cover sheet, the transparent polymeric cover sheet and the layer of removable pressure sensitive adhesive having spaced vents between the outer and front surfaces over the entire area of each of the outer and front surfaces, (3) polymeric film graphics having opposite major surfaces with one of the major surfaces of the film graphics being adhered to the front surface of the layer of removable pressure sensitive adhesive, and a second layer of pressure-sensitive adhesive coextensive with each of the graphics adhered to the major surfaces of the graphics opposite the layer of removable pressure sensitive adhesive.

The term "vents" includes perforations, slits, and the like.

A flexible low-adhesion carrier web which is coextensive with the cover sheet can protect the aggressive pressure-sensitive adhesive and areas of the removable pressure-sensitive adhesive that otherwise would be exposed.

The decorative graphics-forming polymeric film can be a vinyl film which gives the appearance of etched or sand-blasted glass like the Scotchcal™ Series 7725 special effects films. As was done with the prior special effects films, graphics are cut into the decorative polymeric film and its aggressive pressure-sensitive adhesive without cutting through the low-adhesion carrier web, and the adhesive-bearing weed is peeled from the flexible carrier web and discarded. Preferably the peeling step promptly follows the cutting step, before the aggressive pressure-sensitive adhesive can flow back across the cuts. Then a transparent cover sheet coated with removable adhesive and vented through the cover sheet and adhesive is adhered by the removable adhesive to the graphics as well as to exposed areas of the low-adhesion carrier web to complete the novel laminate.

The removable pressure-sensitive adhesive is selected to form a bond to the graphics that both (a) permits the low-adhesion carrier web to be peeled away without disrupting that bond and (b) permits the vented removable adhesive coated cover sheet to be peeled cleanly from the graphics without disrupting the adhesive bond between the graphics and a glass pane or other substrate to which the graphics are being applied.

After removing the low-adhesion carrier web to expose the underlying adhesive areas and wetting the exposed adhesive areas with the above-described detergent, alcohol, and water solution (which is a liquid that can lubricate the adhesives and can evaporate), the wet adhesive areas can be pressed against a wet substrate and a squeegee can be used to eliminate any air between the graphics and the substrate. Because the cover sheet and the layer of removable adhesive thereon are transparent, the user is able to see both the graphics and the underlying substrate and hence is able to reposition the laminate and its graphics with precision until the solution has evaporated through the vents in the layer of removable adhesive and the cover sheet and the graphics have become bonded to the substrate. The polymeric cover sheet and the layer of adhesive adhered thereto can be almost opaque, requiring just enough transparency to enable the user to see margins of the graphics while the laminate is wet with the solution.

After the graphics have become bonded to the substrate, the cover sheet is peeled off with its removable adhesive, thus exposing the graphics.

The vents should be closely and generally uniformly spaced over substantially the full area of the transparent polymeric cover sheet and the layer of removable adhesive. While vents of random sizes and orientation could be used, preferably they are of uniform size and shape, ideally circular perforations. Whether of random or uniform size, shape, and orientation, the vents should be from 0.02 to 0.1 inch (0.5 to 2.5 mm) in diameter, and separated by lands of from 0.04 to 0.4 inch (1 to 10 mm). The vents preferably occupy from 1.0 to 20% of the area of the cover sheet and the layer of removable adhesive. Toward the higher end of that range, the solution can evaporate more quickly. On the other hand, vented cover sheets near or above the higher end of that range might be hard to handle, both in the manufacture of the novel laminate and when removing the vented cover sheet after the laminate has been applied to a substrate.

One benefit afforded by the vents is that they provide avenues of escape for air that a squeegee may bring to the edges of the graphics. Additionally, the vented removable adhesive coated transparent polymeric cover sheet provides two unanticipated benefits. First, the vents, when in an orderly pattern such as a rectangular grid, have been found to facilitate positioning of the graphics on a substrate. Second, when the aforementioned detergent, alcohol, and water solution is used for applying the laminate to a substrate, the appearance of the repositionable adhesive in the laminate turns from cloudy to clear as the solution evaporates through the vents. Clearing emanates radially from each of the vents, and a clear border gradually appears at the edges of the graphics. Each of these effects provides a visual indication to the user that the vented cover sheet can be peeled away without disturbing the graphics.

DESCRIPTION OF THE PREFERRED EMBODIMENTS

In a preferred laminate of the present invention:

1) the vented transparent polymeric cover sheet is a plasticized vinyl film from 0.5 to 6 mils (12.5 to 150 μm) in thickness, and its vents are circular perforations of uniform size ranging from 0.015 to 0.2 inch (0.4 to 5 mm) in diameter and are separated by uniform lands of from 0.04 to 0.4 inch (1 to 10 mm) between adjacent perforations;

2) the removable pressure-sensitive adhesive is generally transparent (especially when applied at low coating weights), is based on hollow tacky microspheres as disclosed in co-assigned U.S. Pat. No. 5,045,569 (Delgado) or solid tacky microspheres as disclosed in co-assigned U.S. Pat. No. 3,691,140 (Silver), and has a coating weight of from 10 to 50 g/m$^2$, preferably toward the low end of this range for economy but not so thin as to be deficient in bonding strength, with the vents in the adhesive being aligned with and of the same size and number as the vents in the cover sheet;

3) said decorative polymeric film is a special effects vinyl film that can give an etched or sand-blasted appearance to graphics on a glass panel and is from 0.5 to 4 mils (12.5 to 100 μm) in thickness, preferably toward the thin end of that range to afford a desirably low profile but not so thin as to lack the desired visual effect; and 4) the layer of aggressive pressure-sensitive adhesive has a coating weight of from 10 to 50 g/m$^2$, preferably toward the thin end of that range to afford a low profile but not but not so thin as to be deficient in bonding strength.

The laminate should be marketed as a composite wherein a flexible low-adhesion carrier web (e.g., of paper or transparent polymeric material) protects the adhesives and has good dimensional stability so that the graphics do not become distorted.

When the vented removable adhesive coated transparent polymeric cover sheet and decorative polymeric film are made from the same polymer, they will have the same thermal expansion characteristics, thus affording good resistance to wrinkling when exposed to adverse environmental conditions during shipment and storage. Preferably, each is plasticized poly(vinyl chloride) which is inexpensive, reasonably durable, and easy to handle in manufacture. Also useful for both the transparent polymeric cover sheet and the decorative polymeric film are polypropylene, polyolefins, acetates, and polyesters such as biaxially oriented poly (ethyleneterephthalate) film. Because the latter is quite strong, it would permit the cover sheet to be as thin as about 0.5 mil (12.5 μm).

The construction of the preferred laminate can better be understood in connection with the drawing.

DETAILED DESCRIPTION OF THE DRAWING

Figure 1:
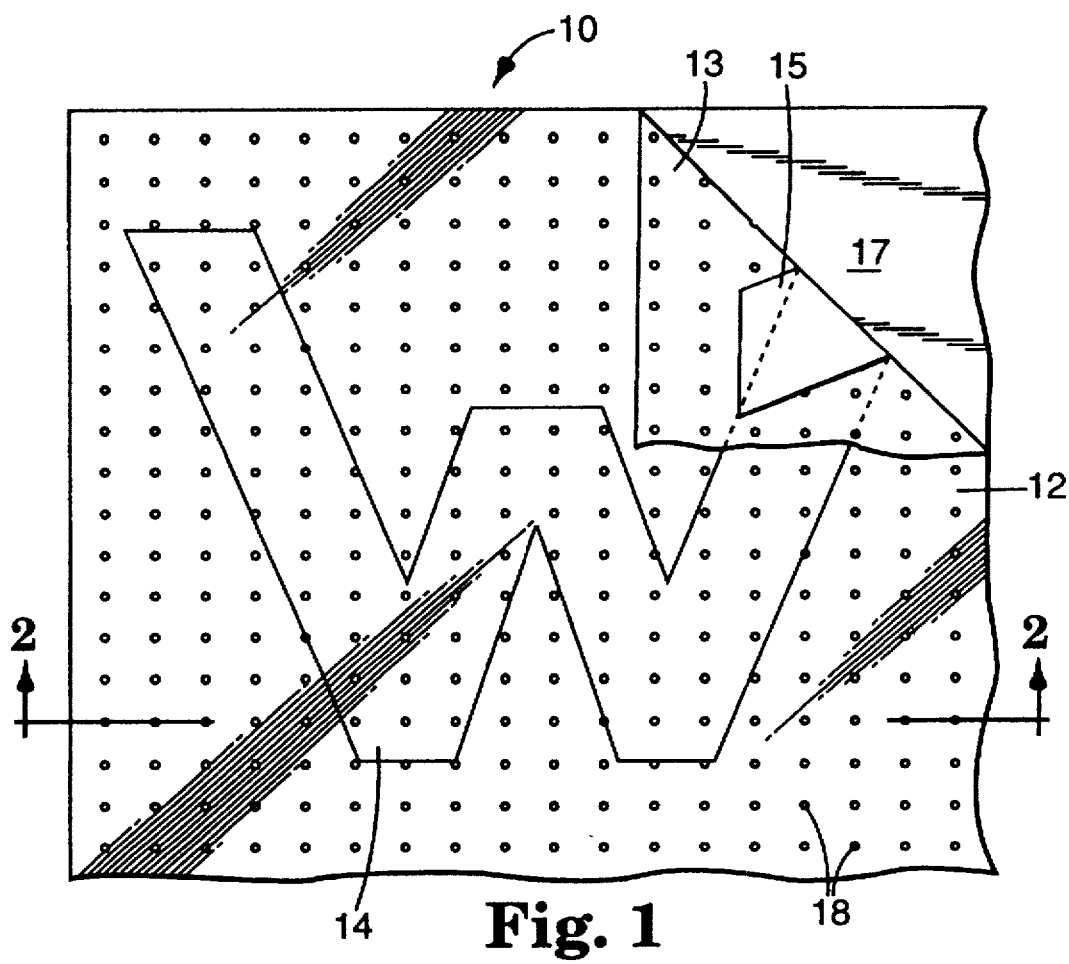
FIG. 1 shows the face of a fragment of a laminate according to the present invention which is supported by a flexible low-adhesion carrier web.
Figure 2:
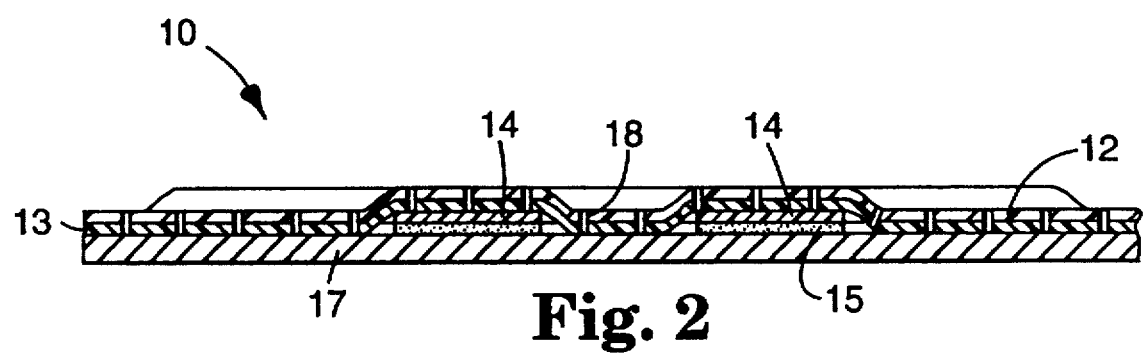
FIG. 2 is a cross-sectional view taken approximately along line 2—2 of FIG. 1.

Referring now to FIGS. 1 and 2, there is illustrated a laminate 10 according to the present invention that comprises, in order, a transparent polymeric cover sheet 12, a layer of removable pressure-sensitive adhesive 13 adhered to a surface of the cover sheet 12 with the cover sheet 12 and layer of adhesive being vented, decorative polymeric film graphics 14 (one letter is shown), and a layer of aggressive pressure-sensitive adhesive 15 that is coextensive with each of the graphics 14. A flexible low-adhesion carrier web 17 that is coextensive with the vented cover sheet 12 and layer of removable adhesive 13 protects the aggressive pressure-sensitive adhesive 15 and areas of the removable pressure-sensitive adhesive between the graphics 14. The vents through the transparent cover sheet 12 and layer of removable adhesive 13 are circular perforations 18 in a rectangular grid.

Figure 3:
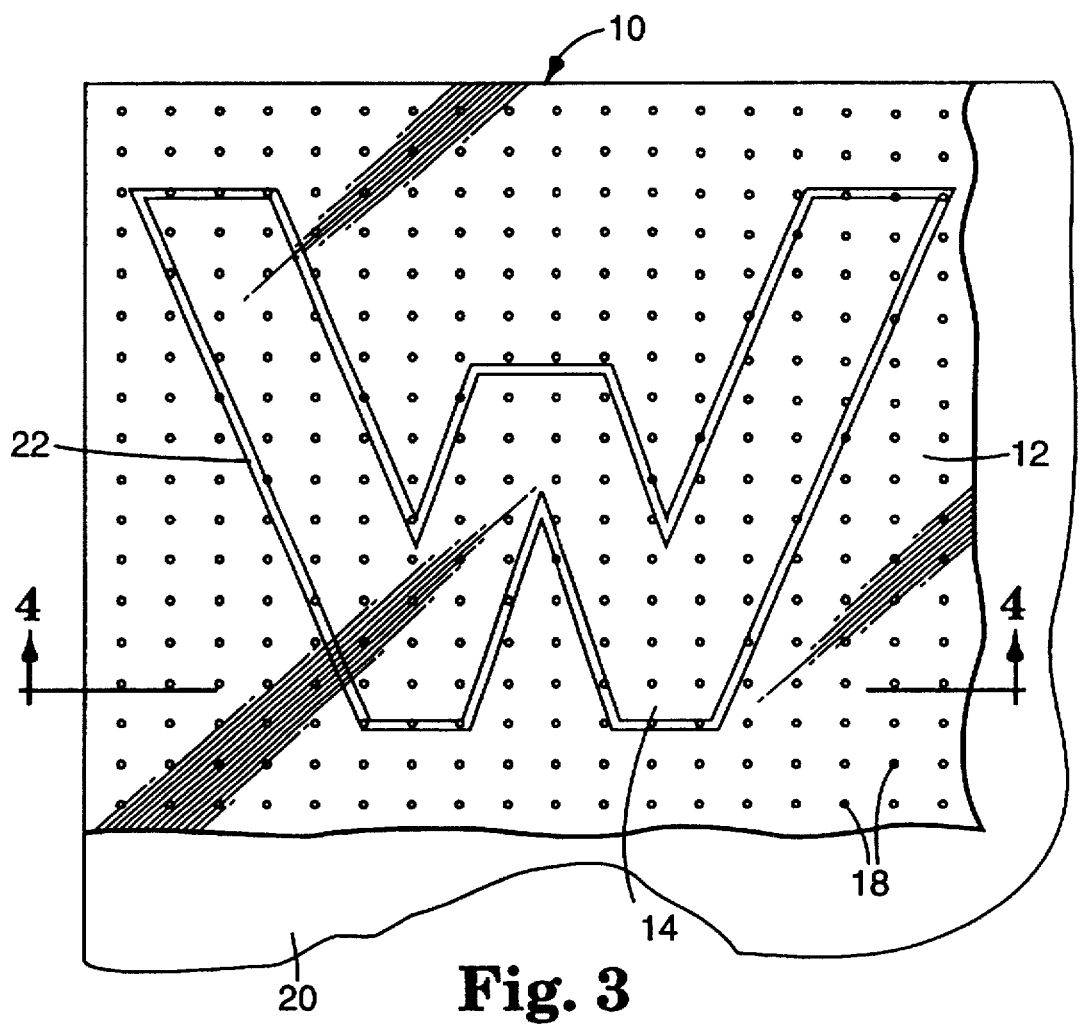
FIG. 3 shows the face of the laminate of FIG. 1 after the carrier web has been peeled away and the laminate has been laid onto a glass substrate while wet with a detergent/alcohol/water solution.
Figure 4:
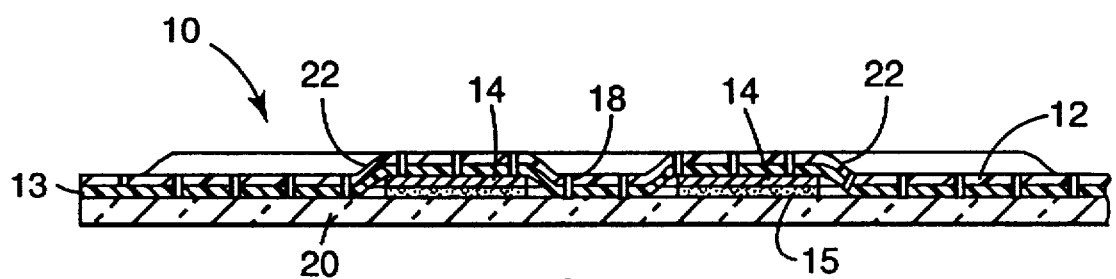
FIG. 4 is a cross-sectional view taken approximately along line 4—4 of FIG. 3.
Figure 5:
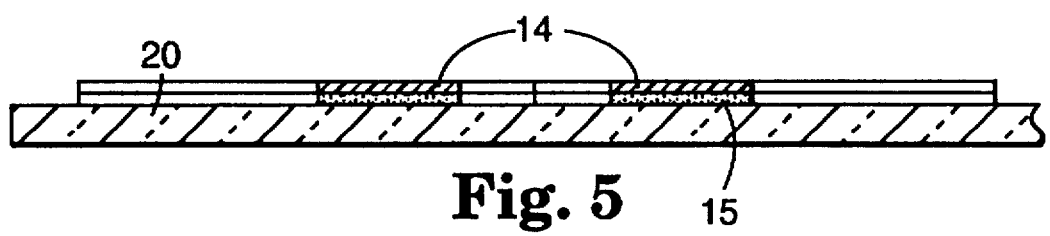
FIG. 5 is a cross-sectional view taken approximately along line 4—4 of FIG. 3 after the a vented cover sheet included in the laminate has been peeled off and discarded.

After the carrier web 17 has been peeled off and discarded, the adhesive face of the laminate 10 and the substrate 20 are wet (by blotting or spraying) with a liquid that can lubricate the adhesives 13 and 15 and can evaporate, such as a detergent, alcohol, and water solution (plain water could also be used, but is less effective). The adhesive face is placed against the wet substrate 20 (see FIGS. 3 and 4), and a squeegee such as a piece of plastic can be used to push solution and air bubbles from beneath each of the graphics 14. Soon thereafter, the layer of removable adhesive 13 in the laminate 10 attains a cloudy appearance. After allowing the solution to evaporate at room temperature, a clear border 22 appears at the edges of the graphics 14 as shown in FIG. 3. The appearance of these borders indicates that the vented transparent cover sheet 12 and layer 13 of removable adhesive can be peeled away without disturbing the graphics 14, leaving the graphics 14 on the substrate 20 as is illustrated in FIG. 5.

EXAMPLES

Example 1

A laminate 10 as shown in FIG. 1 was made.

The decorative polymeric film from which the graphics 14 were formed was identical to the special effects vinyl film of the above-cited Scotchcal™ 7725-314 Frosted Crystal Film. More specifically, the decorative vinyl film was plasticized poly(vinyl chloride) that had been filled with light-diffusing agents, including flecks of aluminum-vapor-coated polyester film, to afford a frosted appearance. The graphics 14 were cut out by a computer-controlled knife from the decorative vinyl film when it was adhered by the layer of aggressive pressure-sensitive adhesive 15 to the low-adhesion carrier web 17 which was a silicone coated release paper liner. In production, it probably would be more economical to form the graphics with a die cutter. After cutting the graphics, the adhesive-bearing weed was peeled off and discarded, leaving the graphics 14 on the carrier web 17.

The transparent polymeric cover sheet 12 was made from a plasticized poly(vinyl chloride) film having a thickness of 4 mils (100 μm). The transparent cover sheet 12 was coated with the removable pressure-sensitive adhesive 13 and laminated to a silicone coated release paper liner. That laminate was then perforated by laser machining through the transparent cover sheet 12, the layer of removable pressure-sensitive adhesive 13 and the release liner. The perforations 18 were circular, 0.04 inch (1 mm) in diameter, and provided a rectangular grid. The perforations were separated by lands of about 3/16 inch (4.8 mm). Mechanical perforations have since been used and have found to be more economical. The release liner was then removed and the vented transparent cover sheet 12 and layer of removable adhesive 13 was laminated to the graphics 14 on the carrier web 17 to form the composite 10 on the carrier web 17.

The removable pressure-sensitive adhesive 13 comprised hollow tacky microspheres as disclosed in the above-cited Delgado patent and had a coating weight of 7 grains/24 in² (29 g/m²). Such a removable pressure-sensitive adhesive is preferred, because it has good aging properties and good adhesion to the vented transparent polymeric cover sheet while releasing cleanly from special effects vinyl films. This combination of properties is not reliably achieved, to the best of my knowledge, in any pressure-sensitive adhesive other than those that are based on tacky microspheres.

The aggressive pressure-sensitive adhesive 15 was a copolymer of isooctyl acrylate and acrylic acid as disclosed in U.S. Pat. No. Re. 24,906 (Ulrich) and had a coating weight of 9.6 grains/24 in² (40 g/m²).

The graphics 14 were transferred from the laminate 10 to a clear glass panel 20 that was 4 inches (10 cm) square. After removing the carrier web 17, both the adhesive face of the laminate 10 and the clear glass panel 20 were wet with a solution of (by weight) 80 parts water, 19.7 parts of isopropyl alcohol, and 0.3 part of Joy™ dish-washing detergent, which is a liquid that lubricates the adhesives 13 and 15 and can evaporate. The adhesive face was placed against the glass panel 20, and a piece of plastic was used to push solution and air bubbles from beneath each element of the graphics 14. After about two hours at room temperature, a clear border 22 appeared at the edges of the graphics 14 (see FIG. 4), and the vented transparent cover sheet 12 was peeled off, carrying with it the entire vented removable adhesive layer 13. The graphics were thus firmly bonded to the glass 20 and had the appearance of sand-blasted glass. Close visual inspection revealed no air bubbles at the interfaces between the graphics 14 and the glass panel 20. The foregoing procedure was repeated, except using a glass panel that had been in a refrigerator at a temperature of 40° F. (4° C.) and returning the panel to the refrigerator as soon as the laminate had been applied. After about 24 hours, the vented polymeric cover sheet was peeled off without disturbing the graphics. This showed that the laminate of the invention can be used to apply graphics to glass windows when they are chilled by cold weather.

Examples 2 and 3

A series of laminates were made in the same way as in Example 1 except having perforations of other diameters and land widths. Each was tested in the same manner as was the laminate of Example 1. As soon as a clear border appeared, the perforated transparent polymeric cover sheet was peeled off without disturbing the graphics. The test results are noted in Table I which also includes Example 1 plus results of testing a Comparative Laminate that was made in the same way as in Example 1 except that the transparent polymeric cover sheet was imperforate.

TABLE I

| | | | | | Vented | Removal Times @ | |
|---|---|---|---|---|---|---|---|
| | Diameter of Perfs | | Land Widths | | Areas | 40° F. (4° C.) | 70° F. (21° C.) |
| Ex | inches | mm | inches | mm | % | hours | hours |
| 1 | 0.015 | 0.4 | 0.105 | 2.7 | 1.7 | 24 | 2 |
| 2 | 0.035 | 0.9 | 0.05 | 1.3 | 14.0 | 8 | 1.5 |
| 3 | 0.015 | 0.4 | 0.25 | 6.35 | 0.2 | 144 | 48 |
| Comparative Laminate imperforate | | | | | | 480 | 168 |

Example 4

A laminate was made in generally the same way as in Example 1 except that a transparent polymeric silicone coated release liner was used as the carrier web 17. That laminate provided the advantage that the entire laminate (except for the graphics 14) was generally transparent, thereby facilitating trial positionings of the graphics on a substrate to approximate its final appearance before the carrier web 17 is removed.

The present invention has now been described with reference to one embodiments and several modifications thereof. It will be apparent to those skilled in the art that many more changes can be made in the embodiment described without departing from the scope of the present invention. For Example, while, as described, the vents through the layer of removable pressure-sensitive adhesive 13 are formed by laser machining or punching at the same time and location that the vents through the cover sheet 12 are formed, the vents in the adhesive 13 could alternatively be formed by other means, such as pattern coating the adhesive on the cover sheet 12 in patterns such as dots, grids or strips oriented to provide vents through the adhesive, at least the majority of which vents will align with vents in the cover sheet 12. Thus, the scope of the present invention should not be limited to the structures and methods described in this application, but only by the structures and method described by the language of the claims and the equivalents thereof

I claim:

1. A method of making a laminate by which graphics can be precisely applied to a substrate, which method comprises the steps of:

applying a layer of aggressive pressure-sensitive adhesive to a flexible low-adhesion carrier web, applying a decorative polymeric film to the layer of aggressive pressure-sensitive adhesive, cutting graphics into the decorative polymeric and the aggressive pressure-sensitive adhesive without cutting through the carrier web, removing and discarding the adhesive-bearing weed between the graphics, applying a layer of removable pressure-sensitive adhesive to a transparent polymeric sheet venting the adhesive coated transparent polymeric sheet over its entire area, and adhering the transparent polymeric sheet to the exposed faces of the graphics by the layer of removable pressure-sensitive adhesive.

2. A method of applying graphics to a substrate according to claim 1, which method further comprises the following steps of removing the carrier web, thus exposing the aggressive pressure-sensitive adhesive, wetting the exposed adhesive areas and the substrate with a liquid that lubricates the adhesive and can evaporate, placing the wet adhesive areas against the wet substrate, allowing the liquid to evaporate through the vents of the adhesive coated transparent polymeric sheet and, peeling off the adhesive-bearing vented polymeric sheet to expose the graphics when a clear border appears at the edges of the graphics.

3. A method of applying graphics to a substrate as defined in claim 2 further comprising, subsequent to the step of peeling off the adhesive-bearing vented polymeric sheet to expose the graphics, the step of repositioning graphics on the substrate.

* * * * *